(12) United States Patent
Pekar et al.

(10) Patent No.: US 8,504,175 B2
(45) Date of Patent: Aug. 6, 2013

(54) USING MODEL PREDICTIVE CONTROL TO OPTIMIZE VARIABLE TRAJECTORIES AND SYSTEM CONTROL

(75) Inventors: Jaroslav Pekar, Pacov (CZ); Gregory E. Stewart, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/792,468

(22) Filed: Jun. 2, 2010

(65) Prior Publication Data

US 2011/0301723 A1 Dec. 8, 2011

(51) Int. Cl.
*G06G 7/70* (2006.01)
*G06F 19/00* (2011.01)
*G06F 17/10* (2006.01)
*G05B 13/04* (2006.01)
*G05B 19/05* (2006.01)
*G05B 19/042* (2006.01)
*B60W 10/06* (2006.01)
*F02D 41/00* (2006.01)

(52) U.S. Cl.
CPC ............ *G05B 13/048* (2013.01); *G05B 13/042* (2013.01); *G05B 19/05* (2013.01); *G05B 19/042* (2013.01); *B60W 10/06* (2013.01); *F02D 41/0072* (2013.01); *F02D 41/0002* (2013.01)
USPC .................. 700/29; 700/28; 700/12; 700/14; 701/102; 701/108; 701/99; 701/101; 701/103; 703/2

(58) Field of Classification Search
USPC ......... 700/18, 19, 29, 28, 12, 14, 16; 706/12, 706/14, 16; 703/2
See application file for complete search history.

(56) References Cited

U.S. PATENT DOCUMENTS 3,744,461 A 7/1973 Davis
4,005,578 A 2/1977 McInerney
(Continued)

FOREIGN PATENT DOCUMENTS

DE 19628796 10/1997
DE 10219832 11/2002
(Continued)

OTHER PUBLICATIONS

Boom, T. and Schutter, B.D., "MPC for Max-Plus-Linear Systems: Closed-Loop Behavior and Tuning", Jun. 2001, Proceedings of the 2001 American Control Conference, Arlington, VA, pp. 325-330.*
(Continued)

*Primary Examiner* — Mohammad Ali
*Assistant Examiner* — Kelvin Booker
(74) *Attorney, Agent, or Firm* — Seager Tufte & Wickhem LLC

(57) ABSTRACT

A method and system of predictive model control of a controlled system with one or more physical components using a model predictive control (MPC) model, determining an iterative, finite horizon optimization of a system model of the controlled system, in order to generate a manipulated value trajectory as part of a control process. At time t sampling a current state of the controlled system a cost function minimizing manipulated variables trajectories is computed with the MPC model for a relatively short time horizon in the future, wherein the MPC uses a quadratic programming (QP) algorithm to find the optimal solution, and wherein the QP algorithm is solved using an Active Sets solver (AS) class algorithm with simple constraints based on gradient projection and using Newton step projection. A move of the manipulated value trajectory is implemented and the control process is moved forward by continuing to shift the prediction horizon forward.

17 Claims, 8 Drawing Sheets

(56) References Cited

U.S. PATENT DOCUMENTS

| | | | |
|---|---|---|---|
| 4,055,158 A | 10/1977 | Marsee | |
| 4,206,606 A | 6/1980 | Yamada | |
| 4,252,098 A | 2/1981 | Tomczak et al. | |
| 4,359,991 A | 11/1982 | Stumpp et al. | |
| 4,383,441 A | 5/1983 | Willis et al. | |
| 4,426,982 A | 1/1984 | Lehner et al. | |
| 4,438,497 A | 3/1984 | Willis et al. | |
| 4,440,140 A | 4/1984 | Kawagoe et al. | |
| 4,456,883 A | 6/1984 | Bullis et al. | |
| 4,485,794 A | 12/1984 | Kimberley et al. | |
| 4,601,270 A | 7/1986 | Kimberley et al. | |
| 4,616,308 A * | 10/1986 | Morshedi et al. | 700/39 |
| 4,653,449 A | 3/1987 | Kamei et al. | |
| 4,671,235 A | 6/1987 | Hosaka | |
| 4,677,559 A | 6/1987 | Van Bruck | |
| 4,735,181 A | 4/1988 | Kaneko et al. | |
| 4,947,334 A | 8/1990 | Massey et al. | |
| 4,962,570 A | 10/1990 | Hosaka et al. | |
| 5,044,337 A | 9/1991 | Williams | |
| 5,076,237 A | 12/1991 | Hartman et al. | |
| 5,089,236 A | 2/1992 | Clerc | |
| 5,094,213 A | 3/1992 | Dudek et al. | |
| 5,095,874 A | 3/1992 | Schnaibel et al. | |
| 5,108,716 A | 4/1992 | Nishizawa | |
| 5,123,397 A | 6/1992 | Richeson | |
| 5,150,289 A | 9/1992 | Badavas | |
| 5,186,081 A | 2/1993 | Richardson et al. | |
| 5,233,829 A | 8/1993 | Komatsu | |
| 5,270,935 A | 12/1993 | Dudek et al. | |
| 5,273,019 A | 12/1993 | Matthews et al. | |
| 5,282,449 A | 2/1994 | Takahashi et al. | |
| 5,293,553 A | 3/1994 | Dudek et al. | |
| 5,349,816 A | 9/1994 | Sanbayashi et al. | |
| 5,365,734 A | 11/1994 | Takeshima | |
| 5,394,322 A * | 2/1995 | Hansen | 700/37 |
| 5,394,331 A | 2/1995 | Dudek et al. | |
| 5,398,502 A | 3/1995 | Watanabe | |
| 5,408,406 A * | 4/1995 | Mathur et al. | 700/45 |
| 5,431,139 A | 7/1995 | Grutter et al. | |
| 5,452,576 A | 9/1995 | Hamburg et al. | |
| 5,477,840 A | 12/1995 | Neumann | |
| 5,560,208 A | 10/1996 | Halimi et al. | |
| 5,570,574 A | 11/1996 | Yamashita et al. | |
| 5,598,825 A | 2/1997 | Neumann | |
| 5,609,139 A | 3/1997 | Ueda et al. | |
| 5,611,198 A | 3/1997 | Lane et al. | |
| 5,690,086 A | 11/1997 | Kawano et al. | |
| 5,692,478 A | 12/1997 | Nogi et al. | |
| 5,697,339 A | 12/1997 | Esposito | |
| 5,704,011 A | 12/1997 | Hansen et al. | |
| 5,746,183 A | 5/1998 | Parke et al. | |
| 5,765,533 A | 6/1998 | Nakajima | |
| 5,771,867 A | 6/1998 | Amstutz et al. | |
| 5,785,030 A | 7/1998 | Paas | |
| 5,788,004 A | 8/1998 | Friedmann et al. | |
| 5,842,340 A | 12/1998 | Bush et al. | |
| 5,846,157 A | 12/1998 | Reinke et al. | |
| 5,893,092 A | 4/1999 | Driscoll | |
| 5,942,195 A | 8/1999 | Lecea et al. | |
| 5,964,199 A | 10/1999 | Atago et al. | |
| 5,970,075 A * | 10/1999 | Wasada | 714/784 |
| 5,974,788 A | 11/1999 | Hepburn et al. | |
| 5,995,895 A | 11/1999 | Watt et al. | |
| 6,029,626 A | 2/2000 | Bruestle | |
| 6,035,640 A | 3/2000 | Kolmanovsky et al. | |
| 6,048,620 A | 4/2000 | Zhong | |
| 6,055,810 A | 5/2000 | Borland et al. | |
| 6,058,700 A | 5/2000 | Yamashita et al. | |
| 6,067,800 A | 5/2000 | Kolmanovsky et al. | |
| 6,076,353 A | 6/2000 | Fruedenberg et al. | |
| 6,105,365 A | 8/2000 | Deeba et al. | |
| 6,122,555 A * | 9/2000 | Lu | 700/28 |
| 6,134,883 A | 10/2000 | Kato et al. | |
| 6,153,159 A | 11/2000 | Engeler et al. | |
| 6,161,528 A | 12/2000 | Akao et al. | |
| 6,170,259 B1 | 1/2001 | Boegner et al. | |
| 6,171,556 B1 | 1/2001 | Burk et al. | |
| 6,178,743 B1 | 1/2001 | Hirota et al. | |
| 6,178,749 B1 | 1/2001 | Kolmanovsky et al. | |
| 6,208,914 B1 * | 3/2001 | Ward et al. | 701/3 |
| 6,216,083 B1 | 4/2001 | Ulyanov et al. | |
| 6,233,922 B1 | 5/2001 | Maloney | |
| 6,236,956 B1 * | 5/2001 | Mantooth et al. | 703/14 |
| 6,237,330 B1 | 5/2001 | Takahashi et al. | |
| 6,242,873 B1 | 6/2001 | Drozdz et al. | |
| 6,263,672 B1 | 7/2001 | Roby et al. | |
| 6,273,060 B1 | 8/2001 | Cullen | |
| 6,279,551 B1 | 8/2001 | Iwano et al. | |
| 6,312,538 B1 | 11/2001 | Latypov et al. | |
| 6,314,724 B1 | 11/2001 | Kakuyama et al. | |
| 6,321,538 B2 | 11/2001 | Hasler | |
| 6,327,361 B1 | 12/2001 | Harshavardhana et al. | |
| 6,338,245 B1 | 1/2002 | Shimoda et al. | |
| 6,341,487 B1 | 1/2002 | Takahashi et al. | |
| 6,347,619 B1 | 2/2002 | Whiting et al. | |
| 6,360,159 B1 | 3/2002 | Miller et al. | |
| 6,360,541 B2 | 3/2002 | Waszkiewicz et al. | |
| 6,360,732 B1 | 3/2002 | Bailey et al. | |
| 6,363,715 B1 | 4/2002 | Bidner et al. | |
| 6,363,907 B1 | 4/2002 | Arai et al. | |
| 6,379,281 B1 | 4/2002 | Collins et al. | |
| 6,389,803 B1 | 5/2002 | Surnilla et al. | |
| 6,425,371 B2 | 7/2002 | Majima | |
| 6,427,436 B1 | 8/2002 | Allansson et al. | |
| 6,431,160 B1 | 8/2002 | Sugiyama et al. | |
| 6,445,963 B1 | 9/2002 | Blevins et al. | |
| 6,446,430 B1 | 9/2002 | Roth et al. | |
| 6,453,308 B1 * | 9/2002 | Zhao et al. | 706/21 |
| 6,463,733 B1 | 10/2002 | Asik et al. | |
| 6,463,734 B1 | 10/2002 | Tamura et al. | |
| 6,466,893 B1 | 10/2002 | Latwesen et al. | |
| 6,470,682 B2 | 10/2002 | Gray, Jr. | |
| 6,470,862 B2 | 10/2002 | Isobe et al. | |
| 6,470,886 B1 | 10/2002 | Jestrabek-Hart | |
| 6,494,038 B2 | 12/2002 | Kobayashi et al. | |
| 6,502,391 B1 | 1/2003 | Hirota et al. | |
| 6,510,351 B1 | 1/2003 | Blevins et al. | |
| 6,512,974 B2 | 1/2003 | Houston et al. | |
| 6,513,495 B1 | 2/2003 | Franke et al. | |
| 6,532,433 B2 | 3/2003 | Bharadwaj et al. | |
| 6,546,329 B2 | 4/2003 | Bellinger | |
| 6,550,307 B1 | 4/2003 | Zhang et al. | |
| 6,553,754 B2 | 4/2003 | Meyer et al. | |
| 6,560,528 B1 | 5/2003 | Gitlin et al. | |
| 6,560,960 B2 | 5/2003 | Nishimura et al. | |
| 6,571,191 B1 | 5/2003 | York et al. | |
| 6,579,206 B2 | 6/2003 | Liu et al. | |
| 6,591,605 B2 | 7/2003 | Lewis | |
| 6,594,990 B2 | 7/2003 | Kuenstler et al. | |
| 6,601,387 B2 | 8/2003 | Zurawski et al. | |
| 6,612,293 B2 | 9/2003 | Schweinzer et al. | |
| 6,615,584 B2 | 9/2003 | Ostertag | |
| 6,625,978 B1 | 9/2003 | Eriksson et al. | |
| 6,629,408 B1 | 10/2003 | Murakami et al. | |
| 6,637,382 B1 | 10/2003 | Brehob et al. | |
| 6,644,017 B2 | 11/2003 | Takahashi et al. | |
| 6,647,710 B2 | 11/2003 | Nishiyama et al. | |
| 6,647,971 B2 | 11/2003 | Vaughan et al. | |
| 6,651,614 B2 | 11/2003 | Flamig-Vetter et al. | |
| 6,662,058 B1 * | 12/2003 | Sanchez | 700/44 |
| 6,666,198 B2 | 12/2003 | Mitsutani | |
| 6,666,410 B2 * | 12/2003 | Boelitz et al. | 244/171.1 |
| 6,671,603 B2 | 12/2003 | Cari et al. | |
| 6,672,052 B2 | 1/2004 | Taga et al. | |
| 6,672,060 B1 | 1/2004 | Buckland et al. | |
| 6,679,050 B1 | 1/2004 | Takahashi et al. | |
| 6,687,597 B2 | 2/2004 | Sulatisky et al. | |
| 6,688,283 B2 | 2/2004 | Jaye | |
| 6,694,244 B2 | 2/2004 | Meyer et al. | |
| 6,694,724 B2 | 2/2004 | Tanaka et al. | |
| 6,705,084 B2 | 3/2004 | Allen et al. | |
| 6,718,254 B2 | 4/2004 | Hashimoto et al. | |
| 6,718,753 B2 | 4/2004 | Bromberg et al. | |
| 6,725,208 B1 * | 4/2004 | Hartman et al. | 700/49 |

| | | | |
|---|---|---|---|
| 6,736,120 B2 | 5/2004 | Surnilla | |
| 6,739,122 B2 | 5/2004 | Kitajima et al. | |
| 6,742,330 B2 | 6/2004 | Genderen | |
| 6,743,352 B2 | 6/2004 | Ando et al. | |
| 6,748,936 B2 | 6/2004 | Kinomura et al. | |
| 6,752,131 B2 | 6/2004 | Poola et al. | |
| 6,752,135 B2 | 6/2004 | McLaughlin et al. | |
| 6,758,037 B2 | 7/2004 | Terada et al. | |
| 6,760,631 B1 | 7/2004 | Berkowitz et al. | |
| 6,760,657 B2 | 7/2004 | Katoh | |
| 6,760,658 B2 | 7/2004 | Yasui et al. | |
| 6,770,009 B2 | 8/2004 | Badillo et al. | |
| 6,772,585 B2 | 8/2004 | Iihoshi et al. | |
| 6,779,344 B2 | 8/2004 | Hartman et al. | |
| 6,779,512 B2 | 8/2004 | Mitsutani et al. | |
| 6,788,072 B2 | 9/2004 | Nagy et al. | |
| 6,789,533 B1 | 9/2004 | Hashimoto et al. | |
| 6,792,927 B2 | 9/2004 | Kobayashi | |
| 6,804,618 B2 | 10/2004 | Junk | |
| 6,805,095 B2 | 10/2004 | Sun et al. | |
| 6,814,062 B2 | 11/2004 | Esteghlal et al. | |
| 6,817,171 B2 | 11/2004 | Zhu | |
| 6,823,667 B2 | 11/2004 | Braun et al. | |
| 6,823,675 B2 | 11/2004 | Brunell et al. | |
| 6,826,903 B2 | 12/2004 | Yahata et al. | |
| 6,827,060 B2 | 12/2004 | Huh | |
| 6,827,061 B2 | 12/2004 | Nytomt et al. | |
| 6,827,070 B2 | 12/2004 | Fehl et al. | |
| 6,834,497 B2 | 12/2004 | Miyoshi et al. | |
| 6,839,637 B2 | 1/2005 | Moteki et al. | |
| 6,849,030 B2 * | 2/2005 | Yamamoto et al. | 477/159 |
| 6,874,467 B2 | 4/2005 | Hunt et al. | |
| 6,879,906 B2 | 4/2005 | Makki et al. | |
| 6,904,751 B2 | 6/2005 | Makki et al. | |
| 6,911,414 B2 | 6/2005 | Kimura et al. | |
| 6,915,779 B2 | 7/2005 | Sriprakash | |
| 6,920,865 B2 | 7/2005 | Lyon | |
| 6,925,372 B2 | 8/2005 | Yasui | |
| 6,925,796 B2 | 8/2005 | Nieuwstadt et al. | |
| 6,928,362 B2 | 8/2005 | Meaney | |
| 6,928,817 B2 | 8/2005 | Ahmad | |
| 6,931,840 B2 | 8/2005 | Strayer et al. | |
| 6,934,931 B2 * | 8/2005 | Plumer et al. | 700/29 |
| 6,941,744 B2 | 9/2005 | Tanaka | |
| 6,945,033 B2 | 9/2005 | Sealy et al. | |
| 6,948,310 B2 | 9/2005 | Roberts, Jr. et al. | |
| 6,953,024 B2 | 10/2005 | Linna et al. | |
| 6,965,826 B2 | 11/2005 | Andres et al. | |
| 6,968,677 B2 | 11/2005 | Tamura | |
| 6,971,258 B2 | 12/2005 | Rhodes et al. | |
| 6,973,382 B2 | 12/2005 | Rodriguez et al. | |
| 6,978,774 B2 | 12/2005 | Fisher et al. | |
| 6,996,975 B2 | 2/2006 | Radhamohan et al. | |
| 7,000,379 B2 | 2/2006 | Makki et al. | |
| 7,013,637 B2 | 3/2006 | Yoshida et al. | |
| 7,016,779 B2 | 3/2006 | Bowyer | |
| 7,028,464 B2 | 4/2006 | Rosel et al. | |
| 7,039,475 B2 * | 5/2006 | Sayyarrodsari et al. | 700/29 |
| 7,047,938 B2 | 5/2006 | Flynn et al. | |
| 7,052,434 B2 | 5/2006 | Makino et al. | |
| 7,055,311 B2 | 6/2006 | Beutel et al. | |
| 7,059,112 B2 | 6/2006 | Bidner et al. | |
| 7,063,080 B2 | 6/2006 | Kita et al. | |
| 7,069,903 B2 | 7/2006 | Surnilla et al. | |
| 7,082,753 B2 | 8/2006 | Dalla Betta et al. | |
| 7,085,615 B2 * | 8/2006 | Persson et al. | 700/108 |
| 7,106,866 B2 | 9/2006 | Astorino et al. | |
| 7,107,978 B2 | 9/2006 | Itoyama | |
| 7,111,450 B2 | 9/2006 | Surnilla | |
| 7,111,455 B2 | 9/2006 | Okugawa et al. | |
| 7,113,835 B2 * | 9/2006 | Boyden et al. | 700/31 |
| 7,117,046 B2 * | 10/2006 | Boyden et al. | 700/52 |
| 7,124,013 B2 | 10/2006 | Yasui | |
| 7,149,590 B2 * | 12/2006 | Martin et al. | 700/29 |
| 7,151,976 B2 | 12/2006 | Lin | |
| 7,152,023 B2 * | 12/2006 | Das | 700/30 |
| 7,155,334 B1 | 12/2006 | Stewart et al. | |
| 7,165,393 B2 | 1/2007 | Betta et al. | |
| 7,165,399 B2 | 1/2007 | Stewart | |
| 7,168,239 B2 | 1/2007 | Ingram et al. | |
| 7,182,075 B2 | 2/2007 | Shahed et al. | |
| 7,184,845 B2 * | 2/2007 | Sayyarrodsari et al. | 700/31 |
| 7,184,992 B1 * | 2/2007 | Polyak et al. | 700/49 |
| 7,188,637 B2 * | 3/2007 | Dreyer et al. | 137/6 |
| 7,194,987 B2 | 3/2007 | Mogi | |
| 7,197,485 B2 * | 3/2007 | Fuller | 706/14 |
| 7,200,988 B2 | 4/2007 | Yamashita | |
| 7,204,079 B2 | 4/2007 | Audoin | |
| 7,275,374 B2 | 10/2007 | Stewart et al. | |
| 7,275,415 B2 | 10/2007 | Rhodes et al. | |
| 7,292,926 B2 | 11/2007 | Schmidt et al. | |
| 7,302,937 B2 | 12/2007 | Ma et al. | |
| 7,321,834 B2 * | 1/2008 | Chu et al. | 700/287 |
| 7,323,036 B2 * | 1/2008 | Boyden et al. | 95/108 |
| 7,328,577 B2 | 2/2008 | Stewart et al. | |
| 7,337,022 B2 * | 2/2008 | Wojsznis et al. | 700/29 |
| 7,349,776 B2 | 3/2008 | Spillane et al. | |
| 7,357,125 B2 | 4/2008 | Kolavennu | |
| 7,375,374 B2 | 5/2008 | Chen et al. | |
| 7,376,471 B2 * | 5/2008 | Das et al. | 700/28 |
| 7,389,773 B2 | 6/2008 | Stewart et al. | |
| 7,392,129 B2 * | 6/2008 | Hill et al. | 701/105 |
| 7,398,149 B2 * | 7/2008 | Ueno et al. | 701/108 |
| 7,400,967 B2 * | 7/2008 | Ueno et al. | 701/104 |
| 7,413,583 B2 * | 8/2008 | Langer et al. | 44/301 |
| 7,415,389 B2 | 8/2008 | Stewart et al. | |
| 7,418,372 B2 | 8/2008 | Nishira et al. | |
| 7,430,854 B2 | 10/2008 | Yasui et al. | |
| 7,433,743 B2 * | 10/2008 | Pistikopoulos et al. | 700/29 |
| 7,444,191 B2 | 10/2008 | Caldwell et al. | |
| 7,444,193 B2 | 10/2008 | Cutler | |
| 7,447,554 B2 | 11/2008 | Cutler | |
| 7,467,614 B2 | 12/2008 | Stewart et al. | |
| 7,469,177 B2 | 12/2008 | Samad et al. | |
| 7,493,236 B1 | 2/2009 | Mock et al. | |
| 7,515,975 B2 | 4/2009 | Stewart | |
| 7,522,963 B2 * | 4/2009 | Boyden et al. | 700/52 |
| 7,536,232 B2 * | 5/2009 | Boyden et al. | 700/52 |
| 7,542,842 B2 * | 6/2009 | Hill et al. | 701/105 |
| 7,577,483 B2 * | 8/2009 | Fan et al. | 700/29 |
| 7,587,253 B2 * | 9/2009 | Rawlings et al. | 700/29 |
| 7,591,135 B2 | 9/2009 | Stewart et al. | |
| 7,599,749 B2 * | 10/2009 | Sayyarrodsari et al. | 700/29 |
| 7,599,750 B2 * | 10/2009 | Piche | 700/29 |
| 7,627,843 B2 | 12/2009 | Dozorets et al. | |
| 7,630,868 B2 * | 12/2009 | Turner et al. | 703/2 |
| 7,634,323 B2 | 12/2009 | Vermillion et al. | |
| 7,634,417 B2 * | 12/2009 | Boyden et al. | 700/29 |
| 7,650,780 B2 | 1/2010 | Hall | |
| 7,668,704 B2 * | 2/2010 | Perchanok et al. | 703/2 |
| 7,698,004 B2 * | 4/2010 | Boyden et al. | 700/52 |
| 7,702,519 B2 * | 4/2010 | Boyden et al. | 706/23 |
| 7,743,606 B2 | 6/2010 | Havlena et al. | |
| 7,752,840 B2 | 7/2010 | Stewart | |
| 7,765,792 B2 * | 8/2010 | Rhodes et al. | 60/278 |
| 7,793,489 B2 | 9/2010 | Wang et al. | |
| 7,798,938 B2 * | 9/2010 | Matsubara et al. | 477/3 |
| 7,826,909 B2 * | 11/2010 | Attarwala | 700/45 |
| 7,831,318 B2 * | 11/2010 | Bartee et al. | 700/29 |
| 7,840,287 B2 * | 11/2010 | Wojsznis et al. | 700/31 |
| 7,844,351 B2 * | 11/2010 | Piche | 700/29 |
| 7,844,352 B2 | 11/2010 | Youzis et al. | |
| 7,846,299 B2 * | 12/2010 | Backstrom et al. | 700/127 |
| 7,850,104 B2 * | 12/2010 | Havlena et al. | 241/34 |
| 7,856,966 B2 | 12/2010 | Saitoh | |
| 7,860,586 B2 * | 12/2010 | Boyden et al. | 700/52 |
| 7,862,771 B2 * | 1/2011 | Boyden et al. | 422/62 |
| 7,877,239 B2 * | 1/2011 | Grichnik et al. | 703/2 |
| 7,878,178 B2 * | 2/2011 | Stewart et al. | 701/110 |
| 7,904,280 B2 * | 3/2011 | Wood | 700/67 |
| 7,905,103 B2 * | 3/2011 | Larsen et al. | 62/228.5 |
| 7,907,769 B2 * | 3/2011 | Sammak et al. | 382/133 |
| 7,930,044 B2 * | 4/2011 | Attarwala | 700/28 |
| 7,933,849 B2 * | 4/2011 | Bartee et al. | 706/19 |
| 7,958,730 B2 * | 6/2011 | Stewart | 60/612 |
| 7,987,145 B2 | 7/2011 | Baramov | |
| 7,996,140 B2 * | 8/2011 | Stewart et al. | 701/102 |
| 8,019,911 B2 | 9/2011 | Dressler et al. | |

| | | |
|---|---|---|
| 8,025,167 B2 | 9/2011 | Schneider et al. |
| 8,032,235 B2 | 10/2011 | Sayyar-Rodsari |
| 8,060,290 B2* | 11/2011 | Stewart et al. ............... 700/26 |
| 8,078,291 B2 | 12/2011 | Pekar et al. |
| 8,109,255 B2 | 2/2012 | Stewart et al. |
| 8,265,854 B2* | 9/2012 | Stewart et al. ............... 701/102 |
| 8,360,040 B2* | 1/2013 | Stewart et al. ............... 123/672 |
| 8,379,267 B2* | 2/2013 | Mestha et al. ................ 358/1.9 |
| 2002/0116104 A1* | 8/2002 | Kawashima et al. ........... 701/37 |
| 2003/0089102 A1 | 5/2003 | Colignon |
| 2003/0150961 A1* | 8/2003 | Boelitz et al. ................ 244/172 |
| 2004/0006973 A1 | 1/2004 | Makki et al. |
| 2004/0034460 A1 | 2/2004 | Folkerts et al. |
| 2004/0040283 A1 | 3/2004 | Yasui et al. |
| 2004/0086185 A1* | 5/2004 | Sun ............................... 382/224 |
| 2004/0117766 A1 | 6/2004 | Mehta et al. |
| 2004/0118107 A1 | 6/2004 | Ament |
| 2004/0165781 A1* | 8/2004 | Sun ............................... 382/236 |
| 2004/0199481 A1* | 10/2004 | Hartman et al. ................ 706/21 |
| 2004/0221889 A1* | 11/2004 | Dreyer et al. ................... 137/88 |
| 2004/0226287 A1 | 11/2004 | Edgar et al. |
| 2005/0143952 A1 | 6/2005 | Tomoyasu et al. |
| 2005/0171667 A1* | 8/2005 | Morita ............................ 701/43 |
| 2005/0178675 A1 | 8/2005 | Hall |
| 2005/0187643 A1* | 8/2005 | Sayyar-Rodsari et al. ..... 700/29 |
| 2005/0193739 A1* | 9/2005 | Brunell et al. ................. 60/772 |
| 2005/0209714 A1 | 9/2005 | Rawlings et al. |
| 2005/0210868 A1 | 9/2005 | Funabashi |
| 2006/0047607 A1* | 3/2006 | Boyden et al. ................ 705/400 |
| 2006/0111881 A1* | 5/2006 | Jackson ............................ 703/2 |
| 2006/0168945 A1 | 8/2006 | Samad et al. |
| 2006/0265203 A1* | 11/2006 | Jenny et al. ....................... 703/9 |
| 2006/0272315 A1 | 12/2006 | Wang et al. |
| 2006/0282178 A1* | 12/2006 | Das et al. ........................ 700/29 |
| 2007/0142936 A1 | 6/2007 | Denison et al. |
| 2007/0144149 A1 | 6/2007 | Kolavennu et al. |
| 2007/0156259 A1* | 7/2007 | Baramov et al. ............... 700/44 |
| 2007/0275471 A1 | 11/2007 | Coward |
| 2008/0071395 A1* | 3/2008 | Pachner ........................ 700/34 |
| 2008/0097625 A1* | 4/2008 | Vouzis et al. ................... 700/29 |
| 2008/0103747 A1* | 5/2008 | Macharia et al. .............. 703/11 |
| 2008/0103748 A1* | 5/2008 | Axelrud et al. ................ 703/12 |
| 2008/0104003 A1* | 5/2008 | Macharia et al. .............. 706/45 |
| 2008/0109100 A1* | 5/2008 | Macharia et al. ............ 700/110 |
| 2008/0125875 A1 | 5/2008 | Stewart et al. |
| 2008/0132178 A1* | 6/2008 | Chatterjee et al. .............. 455/75 |
| 2008/0183311 A1 | 7/2008 | MacArthur et al. |
| 2008/0208778 A1* | 8/2008 | Sayyar-Rodsari et al. ..... 700/29 |
| 2008/0244449 A1 | 10/2008 | Morrison et al. |
| 2008/0249697 A1 | 10/2008 | Stewart et al. |
| 2009/0005889 A1* | 1/2009 | Sayyar-Rodsari .............. 700/44 |
| 2009/0008351 A1* | 1/2009 | Schneider et al. ............ 212/272 |
| 2009/0043546 A1 | 2/2009 | Srinivasan et al. |
| 2009/0131216 A1 | 5/2009 | Matsubara et al. ............. 477/37 |
| 2009/0182518 A1* | 7/2009 | Chu et al. ........................ 702/61 |
| 2009/0198350 A1* | 8/2009 | Thiele ............................ 700/30 |
| 2009/0240480 A1* | 9/2009 | Baramov ......................... 703/6 |
| 2009/0254202 A1* | 10/2009 | Pekar et al. ..................... 700/29 |
| 2009/0287320 A1* | 11/2009 | MacGregor et al. ............ 700/29 |
| 2009/0312998 A1* | 12/2009 | Berckmans et al. ............ 703/11 |
| 2010/0017094 A1* | 1/2010 | Stewart et al. ................ 701/102 |
| 2010/0038158 A1* | 2/2010 | Whitney et al. ............... 701/102 |
| 2010/0050607 A1* | 3/2010 | He et al. ......................... 60/286 |
| 2010/0121609 A1* | 5/2010 | Gorinevsky ................... 702/183 |
| 2010/0122523 A1* | 5/2010 | Vosz ............................... 60/285 |
| 2010/0204808 A1* | 8/2010 | Thiele ............................ 700/30 |
| 2010/0268353 A1* | 10/2010 | Crisalle et al. ................. 700/29 |
| 2010/0300070 A1* | 12/2010 | He et al. ......................... 60/274 |
| 2010/0305719 A1* | 12/2010 | Pekar et al. ..................... 700/29 |
| 2010/0327090 A1* | 12/2010 | Havlena et al. ................ 241/18 |
| 2011/0006025 A1* | 1/2011 | Schneider et al. ............ 212/273 |
| 2011/0010073 A1* | 1/2011 | Stewart et al. ................ 701/102 |
| 2011/0029235 A1* | 2/2011 | Berry ............................ 701/207 |
| 2011/0046752 A1* | 2/2011 | Piche .............................. 700/29 |
| 2011/0060424 A1* | 3/2011 | Havlena ......................... 700/29 |
| 2011/0066308 A1* | 3/2011 | Yang et al. ....................... 701/22 |
| 2011/0071653 A1 | 3/2011 | Kihas |
| 2011/0087420 A1* | 4/2011 | Stewart et al. ................ 701/102 |
| 2011/0104015 A1* | 5/2011 | Boyden et al. ................ 706/17 |
| 2011/0106317 A1* | 5/2011 | Kram et al. .................... 700/281 |
| 2011/0125293 A1* | 5/2011 | Havlena ......................... 700/30 |
| 2011/0131017 A1* | 6/2011 | Cheng et al. ...................... 703/2 |
| 2011/0134447 A1* | 6/2011 | Mestha et al. ................. 358/1.9 |
| 2011/0167025 A1* | 7/2011 | Danai et al. ..................... 706/12 |
| 2011/0270505 A1* | 11/2011 | Chaturvedi et al. ........... 701/102 |
| 2011/0301723 A1 | 12/2011 | Pekar et al. |
| 2012/0010732 A1* | 1/2012 | Stewart et al. .................. 700/19 |
| 2012/0116649 A1 | 5/2012 | Stewart et al. |

FOREIGN PATENT DOCUMENTS

| | | |
|---|---|---|
| EP | 0301527 | 2/1989 |
| EP | 0950803 | 4/1999 |
| EP | 1134368 | 3/2001 |
| EP | 1180583 | 2/2002 |
| EP | 1221544 | 7/2002 |
| EP | 1245811 | 10/2002 |
| EP | 1686251 | 8/2006 |
| EP | 2107439 A1 * | 10/2009 |
| EP | 2146258 A1 * | 1/2010 |
| JP | 59190443 | 10/1984 |
| JP | 2010282618 A * | 12/2010 |
| WO | 0232552 | 4/2002 |
| WO | 02101208 | 12/2002 |
| WO | 03048533 | 6/2003 |
| WO | 03065135 | 8/2003 |
| WO | 03078816 | 9/2003 |
| WO | 2004027230 | 4/2004 |
| WO | 2008033800 | 3/2008 |
| WO | WO 2008115911 A1 * | 9/2008 |

OTHER PUBLICATIONS

Diehl, M.; Ferreau, H.J.; and Haverbeke, N., "Efficient Numerical Methods for Nonlinear MPC and Moving Horizon Estimation", Sep. 2008, Intl Workshop on Assessment and Future Directions of NMPC, Pavia, Italy.*

Guerreiro, B.J.; Silvestre, C.; Cunha, R.; and Pascoal, A., "Trajectory Tracking Nonlinear Model Predictive Control for Autonomous Surface Craft", Aug. 2009, Proceedings of the European Control Conference, Budapest, Hungary.*

Jonsson, J., "Fuel Optimized Predictive Following in Low Speed Conditions", Jun. 2003, Avdelning Institution, Vehicular Systems, Department of Electrical Engineering.*

Keulen, T.; Naus, G.; Jager, B.; Molengraft, R.; Steinbuch, M.; and Aneke, E., "Predictive Cruise Control in Hybrid Electric Vehicles", May 2009, World Electric Journal, vol. 3, ISSN 2032-6653.*

Mehta, N., "The Application of Model Predictive Control to Active Automotive Suspensions", May 1996, Vehicle Dynamics and Control Laboratory, Department of Mechanical Engineering, University of California, Berkeley.*

Murayama, A. and Yamakita, M., "Speed Control of Vehicles and Variable Valve Lift Engine by Nonlinear MPC", Aug. 2009, ICROS-SICE International Joint Conference 2009, Fukuoka International Congress Center, Japan.*

Schutter, D. and Boom, T.J.J., "Model Predictive Control for Max-Min-Plus-Scaling Systems", Jun. 2001, Proceedings of the 2001 American Control Conference, Arlington, VA, pp. 319-324.*

Wang, Y. and Boyd, S., "Fast Model Predictive Control Using Online Optimization", Jul. 2008, Proceedings of the 17$^{th}$ World Congress, The International Federation of Automatic Control, Seoul, Korea.*

Wang, X. and Xiao, J., "PSO-Based Model Predictive Control for Nonlinear Processes", 2005, Advances in Natural Computation, Lecture Notes in Computer Science, vol. 3611/2005, 424.*

Zavala, V.M., and Biegler, L.T., The Advanced-Step NMPC Controller: Optimality, Stability and Robustness, Jun. 2007, Automatica, vol. 45, pp. 86-93.*

Zeilinger, M.N.; Jones, C.N.; Raimondo, D.M.; and Morari, M., "Real-time MPC-Stability Through Robust MPC Design", Dec. 2009, Joint 48$^{th}$ IEEE Conference on Decision and Control and 28$^{th}$ Chinese Control Conference, Shanghai, P.R. China.*

Zhu, Y., "Constrained Nonlinear Model Predictive Control for Vehicle Regulation", 2008, Dissertation, Degree Doctor of Philosophy in the Graduate School of the Ohio State University.*

Axehill, D.; and Hansson, A., "A Dual Gradient Projection Quadratic Programming Algorithm Tailored for Model Predictive Control", Dec. 2008, Proceedings of the 47th IEEE Conference on Decision and Control.*

Axehill, D.; and Hansson, A., "A Dual Gradient Projection Quadratic Programming Algorithm Tailored for Mixed Integer Predictive Control", Jan. 2008, Technical Report from the Automatic Control Group, available "www.control.isy.liu.se/publications".*

Baffi, G.; Morris, J.; and Martin, E., "Non-Linear Model Based Predictive Control Through Dynamic Non-Linear Partial Least Squares", Jan. 2002, Institution of Chemical Engineers, Trans IChemE, vol. 80, Part A.*

Dunbar, W., "Model Predictive Control: Extension to Coordinated Multi-Vehicle Formations and Real-Time Implementation", Dec. 2001, California Institute of Technology.*

Oliveira, N.M.C.; and Biegler, L.T., "Contraint Handling and Stability Properties of Model Predictive Control", Jan. 1993, Department of Chemical Engineering, Carnegie Mellon University Research Showcase.*

Patrinos, P.; Sopasakis, P.; and Sarimveis, H., "A Global Piecewise Smooth Newton Method for Fast Large-Scale Model Predictive Control", 2010, Technical Report TR2010-02, National Technical University of Athens.*

Rajamani, M.R., "Data-based Techniques to Improve State Estimation in Model Predictive Control", 2007, PhD Dissertation, Chemical Engineering, University of Wisconsin-Madison.*

Takacs, G.; and Rohl-Ilkiv, B., "Newton-Raphson Based Efficient Model Predictive Control Applied on Active Vibrating Structures", Aug. 2009, Proceedings of the European Control Conference 2009.*

Wright, S.J., "Applying New Optimization Algorithms to Model Predictive Control", 1997, 5th International Conference on Chemical Process Control.*

"SCR, 400-csi Coated Catalyst," Leading NOx Control Technologies Status Summary, 1 page prior to the filing date of the present application.

Advanced Petroleum-Based Fuels-Diesel Emissions Control (APBF-DEC) Project, "Quarterly Update," No. 7, 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control of EGR in Diesel Engines," IEEE TCST, vol. 3, No. 1, 12 pages, Mar. 1995.

Bemporad, et al., "Explicit Model Predictive Control," 1 page, prior to filing date of present application.

Borrelli, "Constrained Optimal Control of Linear and Hybrid Systems," Lecture Notes in Control and Information Sciences, vol. 290, 2003.

Catalytica Energy Systems, "Innovative NOx Reduction Solutions for Diesel Engines," 13 pages, 3rd Quarter, 2003.

Chatterjee, et al. "Catalytic Emission Control for Heavy Duty Diesel Engines," JM, 46 pages, prior to filing date of present application.

U.S. Appl. No. 12/973,704, filed Dec. 20, 2010.

Delphi, Delphi Diesel NOx Trap (DNT), 3 pages, Feb. 2004.

GM "Advanced Diesel Technology and Emissions," powertrain technologies—engines, 2 pages, prior to filing date of present application.

Guzzella, et al., "Control of Diesel Engines," IEEE Control Systems Magazine, pp. 53-71, Oct. 1998.

Havelena, "Componentized Architecture for Advanced Process Management," Honeywell International, 42 pages, 2004.

Hiranuma, et al., "Development of DPF System for Commercial Vehicle—Basic Characteristic and Active Regeneration Performance," SAE Paper No. 2003-01-3182, Mar. 2003.

Honeywell, "Profit Optimizer a Distributed Quadratic Program (DQP) Concepts Reference," 48 pages, prior to filing date of present application.

http://www.not2fast.wryday.com/turbo/glossary/turbo_glossary.shtml, "Not2Fast: Turbo Glossary," 22 pages, printed Oct. 1, 2004.

http://www.tai-cwv.com/sbl106.0.html, "Technical Overview—Advanced Control Solutions," 6 pages, printed Sep. 9, 2004.

Kelly, et al., "Reducing Soot Emissions from Diesel Engines Using One Atmosphere Uniform Glow Discharge Plasma," SAE Paper No. 2003-01-1183, Mar. 2003.

Kolmanovsky, et al., "Issues in Modeling and Control of Intake Flow in Variable Geometry Turbocharged Engines", 18th IFIP Conf. System Modeling and Optimization, pp. 436-445, Jul. 1997.

Kulhavy, et al. "Emergy Technologies for Enterprise Optimization in the Process Industries," Honeywell, 12 pages, Dec. 2000.

Locker, et al., "Diesel Particulate Filter Operational Characterization," Corning Incorporated, 10 pages, prior to filing date of present application.

Lu, "Challenging Control Problems and Engineering Technologies in Enterprise Optimization," Honeywell Hi-Spec Solutions, 30 pages, Jun. 4-6, 2001.

Moore, "Living with Cooled-EGR Engines," Prevention Illustrated, 3 pages, Oct. 3, 2004.

National Renewable Energy Laboratory (NREL), "Diesel Emissions Control—Sulfur Effects Project (DECSE) Summary of Reports," U.S. Department of Energy, 19 pages, Feb. 2002.

Salvat, et al., "Passenger Car Serial Application of a Particulate Filter System on a Common Rail Direct Injection Engine," SAE Paper No. 2000-01-0473, 14 pages, Feb. 2000.

Shamma, et al. "Approximate Set-Valued Observers for Nonlinear Systems," IEEE Transactions on Automatic Control, vol. 42, No. 5, May 1997.

Soltis, "Current Status of NOx Sensor Development," Workshop on Sensor Needs and Requirements for PEM Fuel Cell Systems and Direct-Injection Engines, 9 pages, Jan. 25-26, 2000.

Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.

Storset, et al., "Air Charge Estimation for Turbocharged Diesel Engines," vol. 1 Proceedings of the American Control Conference, 8 pages, Jun. 28-30, 2000.

The MathWorks, "Model-Based Calibration Toolbox 2.1 Calibrate complex powertrain systems," 4 pages, printed prior to filed of present application.

The MathWorks, "Model-Based Calibration Toolbox 2.1.2," 2 pages, prior to filing date of present application.

Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

Van Basshuysen et al., "Lexikon Motorentechnik," (Dictionary of Automotive Technology) published by Vieweg Verlag, Wiesbaden 039936, p. 518, 2004. (English Translation).

Zenlenka, et al., "An Active Regeneration as a Key Element for Safe Particulate Trap Use," SAE Paper No. 2001-0103199, 13 pages, Feb. 2001.

Bertsekas, "On the Goldstein-Levitin-Polyak Gradient Projection Method," IEEE Transactions on Automatic Control, vol. AC-21, No. 2, pp. 174-184, Apr. 1976.

Bertsekas, "Projected Newton Methods for Optimization Problems with Simple Constraints," SIAM J. Control and Optimization, vol. 20, No. 2, pp. 221-246, Mar. 1982.

U.S. Appl. No. 13/353,178, filed Jan. 8, 2012.

"Model Predictive Control Toolbox Release Notes," The Mathworks, 24 pages, Oct. 2008.

"MPC Implementation Methods for the Optimization of the Response of Control Valves to Reduce Variability," Advanced Application Note 002, Rev. A, 10 pages, 2007.

Bemporad et al., "Model Predictive Control Toolbox 3, User's Guide," Matlab Mathworks, 282 pages, 2008.

Bemporad et al., "The Explicit Linear Quadratic Regulator for Constrained Systems," Automatica, 38, pp. 3-20, 2002.

Bemporad, "Model Predictive Control Based on Linear Programming—The Explicit Solution," IEEE Transactions on Automatic Control, vol. 47, No. 12, pp. 1974-1984, Dec. 2002.

Bemporad, "Model Predictive Control Design: New Trends and Tools," Proceedings of the 45th IEEE Conference on Decision & Control, pp. 6678-6683, Dec. 13-15, 2006.

Borrelli et al., "An MPC/Hybrid System Approach to Traction Control," IEEE Transactions on Control Systems Technology, vol. 14, No. 3, pp. 541-553, May 2006.

Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.

Bunting, "Increased Urea Dosing Could Cut SCR Truck Running Costs", http://www.automotiveworld.com/article/85897-increased-urea-dosing-could-cut-scr-truck-running-costs, Automotive World, 3 pages, Feb. 24, 2011, printed Mar. 2, 2011.
International Application Status Report for WO 2008/033800.
U.S. Appl. No. 13/236,217.
U.S. Appl. No. 13/290,012.
De Schutter et al., "Model Predictive Control for Max-Min-Plus-Scaling Systems," Proceedings of the 2001 American Control Conference, Arlington, Va, pp. 319-324, Jun. 2001.
Johansen et al., "Hardware Architecture Design for Explicit Model Predictive Control," Proceedings of ACC, 6 pages, 2006.
Johansen et al., "Hardware Synthesis of Explicit Model Predictive Controllers," IEEE Transactions on Control Systems Technology, vol. 15, No. 1, Jan. 2007.
Maciejowski, "Predictive Control with Constraints," Prentice Hall, Pearson Education Limited, 4 pages, 2002.
Mariethoz et al., "Sensorless Explicit Model Predictive Control of the DC-DC Buck Converter with Inductor Current Limitation," IEEE Applied Power Electronics Conference and Exposition, pp. 1710-1715, 2008.
Marjanovic, "Towards a Simplified Infinite Horizon Model Predictive Controller," 6 pages, Proceedings of the $5^{th}$ Asian Control Conference, 6 pages, Jul. 20-23, 2004.
Mayne et al., "Constrained Model Predictive Control: Stability and Optimality," Automatica, vol. 36, pp. 789-814, 2000.
Ortner et al., "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.
Ortner et al., "Predictive Control of a Diesel Engine Air Path," IEEE Transactions on Control Systems Technology, vol. 15, No. 3, pp. 449-456, May 2007.
Pannocchia et al., "Combined Design of Disturbance Model and Observer for Offset-Free Model Predictive Control," IEEE Transactions on Automatic Control, vol. 52, No. 6, 6 pages, 2007.
Qin et al., "A Survey of Industrial Model Predictive Control Technology," Control Engineering Practice, 11, pp. 733-764, 2003.
Rawlings, "Tutorial Overview of Model Predictive Control," IEEE Control Systems Magazine, pp. 38-52, Jun. 2000.
Schauffele et al., "Automotive Software Engineering Principles, Processes, Methods, and Tools," SAE International, 10 pages, 2005.
Stewart et al., "A Model Predictive Control Framework for Industrial Turbodiesel Engine Control," Proceedings of the $47^{th}$ IEEE Conference on Decision and Control, 8 pages, 2008.
Stewart et al., "A Modular Model Predictive Controller for Turbodiesel Problems," First Workshop on Automotive Model Predictive Control, Schloss Muhldorf, Feldkirchen, Johannes Kepler University, Linz, 3 pages, 2009.
Tondel et al., "An Algorithm for Multi-Parametric Quadratic Programming and Explicit MPC Solutions," Automatica, 39, pp. 489-497, 2003.
Van Den Boom et al., "MPC for Max-Plus-Linear Systems: Closed-Loop Behavior and Tuning," Proceedings of the 2001 American Control Conference, Arlington, Va, pp. 325-330, Jun. 2001.
"Model Predictive Control," Wikipedia, pp. 1-5, Jan. 22, 2009. http://en.wikipedia.org/w/index.php/title=Special:Book&bookcmd=download&collecton_id=641cd1b5da77cc&writer=rl&return_to=Model predictive control, retrieved Nov. 20, 2012.
Baffi et al., "Non-Linear Model Based Predictive Control Through Dynamic Non-Linear Partial Least Squares," Trans IChemE, vol. 80, Part A, pp. 75-86, Jan. 2002.
Search Report for Corresponding, Application No. 11167549.2 dated Nov. 27, 2012.
U.S. Appl. No. 13/290,025, filed Nov. 2011.

* cited by examiner

USING MODEL PREDICTIVE CONTROL TO OPTIMIZE VARIABLE TRAJECTORIES AND SYSTEM CONTROL

TECHNICAL FIELD

The present technology relates generally to automated process control, and more particularly to model predictive control.

BACKGROUND

Many advanced control techniques are formulated as optimization problems, typically as mathematical programming. One very successful advanced control technique is Model based Predictive Control (MPC). The MPC method is very well known in the process industry and it has been proven by many practical applications. There are MPC formulations for both linear and nonlinear systems. Nonlinear MPC requires solution of nonlinear mathematical programs in real-time which can be a challenging problem, for example due to a limitation of the computing resources, the complexity of the problem to solve, or the time available to solve it. Therefore, most of the practical applications are based on a linearity assumption or approximation. The linear MPC solutions are usually formulated as Quadratic Programming.

In the process industry, it is possible to use relatively powerful standard computers. This is not possible in many embedded applications where the embedded platform has relatively limited computational and storage resources. Therefore, more "modern" control techniques based on real-time optimization may require more computational resources than are available for such applications. Furthermore the sampling periods of embedded digital control systems can be much faster. For example, in an industrial process the sampling periods are typically at least in order of seconds while in embedded applications they often start at about 10 milliseconds. It is therefore a challenge to implement the advanced control methods that require real-time optimization for such small sampling periods.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of systems and methods are illustrated in the various views, those skilled in the art will recognize that many of the examples provided have suitable alternatives that can be utilized. Moreover, while the various views are described specifically with respect to several illustrative control systems, it should be understood that the controllers and methods described herein could be applied to the control of other types of systems, if desired.

The technology described herein utilizes an MPC-based control strategy that uses an iterative, finite horizon optimization of a system model. At time t the current system state is sampled and a cost function minimizing manipulated variables trajectories is computed, for example using a numerical minimization algorithm, for a time horizon in the future: [t, t+T]. Specifically, an online or on-the-fly calculation is used to explore state trajectories that emanate from the current state and find a cost minimizing manipulated variable trajectories until time t+T. Such a strategy may be determined through a solution of quadratic program (QP). A step of the manipulated variables trajectories is implemented, then the system state is sampled again and the calculations are repeated starting from the now current state, yielding a new control and new predicted state path. The prediction horizon keeps being shifted forward and for this reason MPC is also called receding horizon control.

According to one example embodiment, the inventive subject matter hereof provides an Active Sets solver (AS) class algorithm for solving the QP problem with simple constraints only based on gradient projection and using Newton step projection. In an AS class algorithm, simple (or box) constraints for optimization variables are defined as the lower and upper bounds, e.g. "LB<=X<=UB" where X is the optimization variable, and LB and UB are the lower and upper bounds, respectively. The gradient projection based method enables adding or removing of multiple constraints from the working set in each iteration of the algorithm, to enable quicker identification of the set of active constraints in the optimum solution. In addition, the Newton step projection speeds up the convergence of the algorithm. According to one embodiment, the method and corresponding system is used to solve QPs with simple constraints arising from MPC control.

Figure 1A:
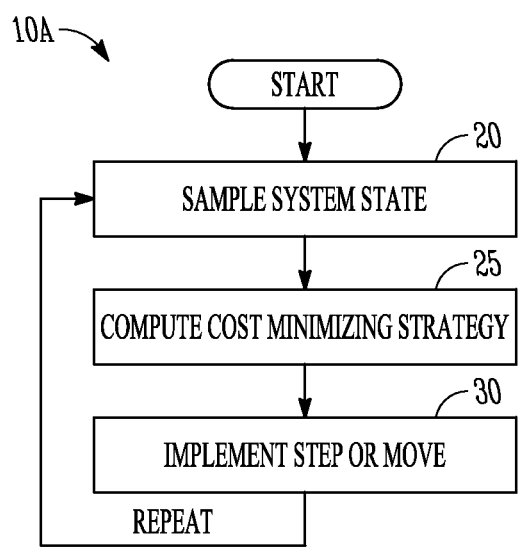
FIGS. 1A and 1B illustrate a process and software 10A and 10B incorporating an MPC control technology according to the present technology.
Figure 1B:
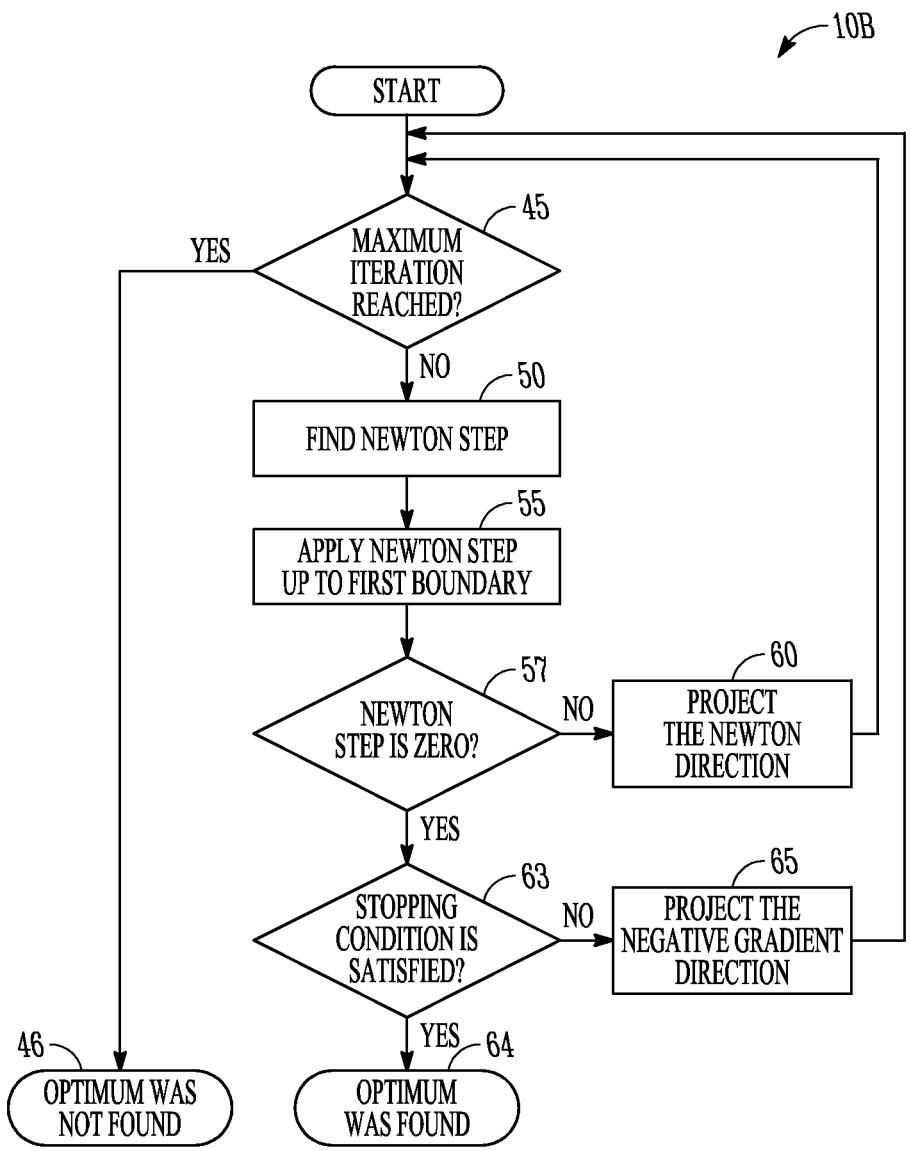
Figure 2:
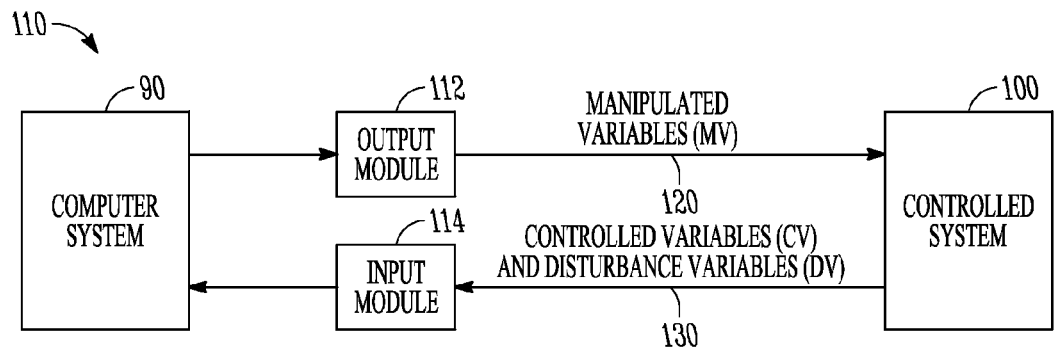
FIG. 2 illustrates a controller 110 incorporating an MPC control technology according to the present technology.

Referring now to FIGS. 1A, 1B and 2, there is illustrated a flow chart and system diagram of a first embodiment of a system for model predictive control according to the invention. As will be described in more detail below, the improved process 10A and corresponding controller 110 provide a model predictive control approach that can be implemented with less computational resources and/or with greater speed than other approaches. In one embodiment, as illustrated below, the system is used in an embedded application with limited computational resources. Accordingly, the process 10A and controller 110 provide for using an MPC model to determine an iterative, finite horizon optimization of a system model, in order to generate a manipulated variables trajectories.

a. At time t, sampling the current system state (20) and computing a cost function minimizing manipulated variables trajectories with the MPC model, using the method described in FIG. 1B, for a relatively short time horizon in the future: [t, t+T]. (25)

b. Implementing a step or move of the manipulated variables trajectories. (30)

c. Repeating the control calculation starting from the now current state to yield a new control and new predicted state path.

d. Continuing the control process by continuing to shift the prediction horizon forward.

Referring now to FIG. 1B, there is illustrated the process 10B used to determine a cost function minimizing manipulated variables trajectories and set of active constraints based on the current system state:

a. Check if maximum of iteration of the algorithm was reached (45). If yes, then solution was not found (46) and the process 10B returns the suboptimal manipulated variables trajectories as the result. Else continue with new iteration.

b. Solve the set of equalities of Karush-Kuhn-Tucker (KKT) system with current active constraints set to get the Newton step. (50)

c. Move along the Newton step up to the nearest boundary constraint and consider the Newton step as the rest of full step (55).

d. Check if Newton step length is zero (57). If yes, continue by checking the stopping conditions (63). Else the new set of active constraints can be found using the projection of Newton step onto subspace of constraints. (60)

e. Check if all Lagrange multipliers associated with active constraints are negative and the coordinates of gradient corresponding to non-active constraints are zeros (63). If yes, the optimum was found (64), else look for better solution by using projection of the negative gradient direction onto subspace of constraints (65).

f. Project negative gradient onto subspace of constraints to get new active set of constraints and improve the objective (65).

According to one alternate embodiment, a warm-start is used to reduce the number of iterations and improve convergence. According to another embodiment, the simple constraints are divided into hard constraints for the manipulated variables (such as actuators) with the other constraints (such as system state, system output) formulated as soft constraints. In another embodiment, the optimization problem takes the form of:

$$\min_x \frac{1}{2} x^T G x + x^T f, \text{ s.t. } x_{min} \leq x \leq x_{max}$$

Referring now to FIG. 2, there is illustrated a simplified block diagram of a controlled system 100 under the control of a controller 110. Controller 110 includes a computer system 90, an output module 112, and an input module 114. In operation, controller 110 generates sequence of manipulated variables (MVs) 120 from module 112 and receives sequence of controlled variables and disturbance variables (input variables) 130 from input module 114. Control outputs and inputs 120 and 130 may take the form of analog or digital control signals sent to and received from controlled system 100.

Figure 3:
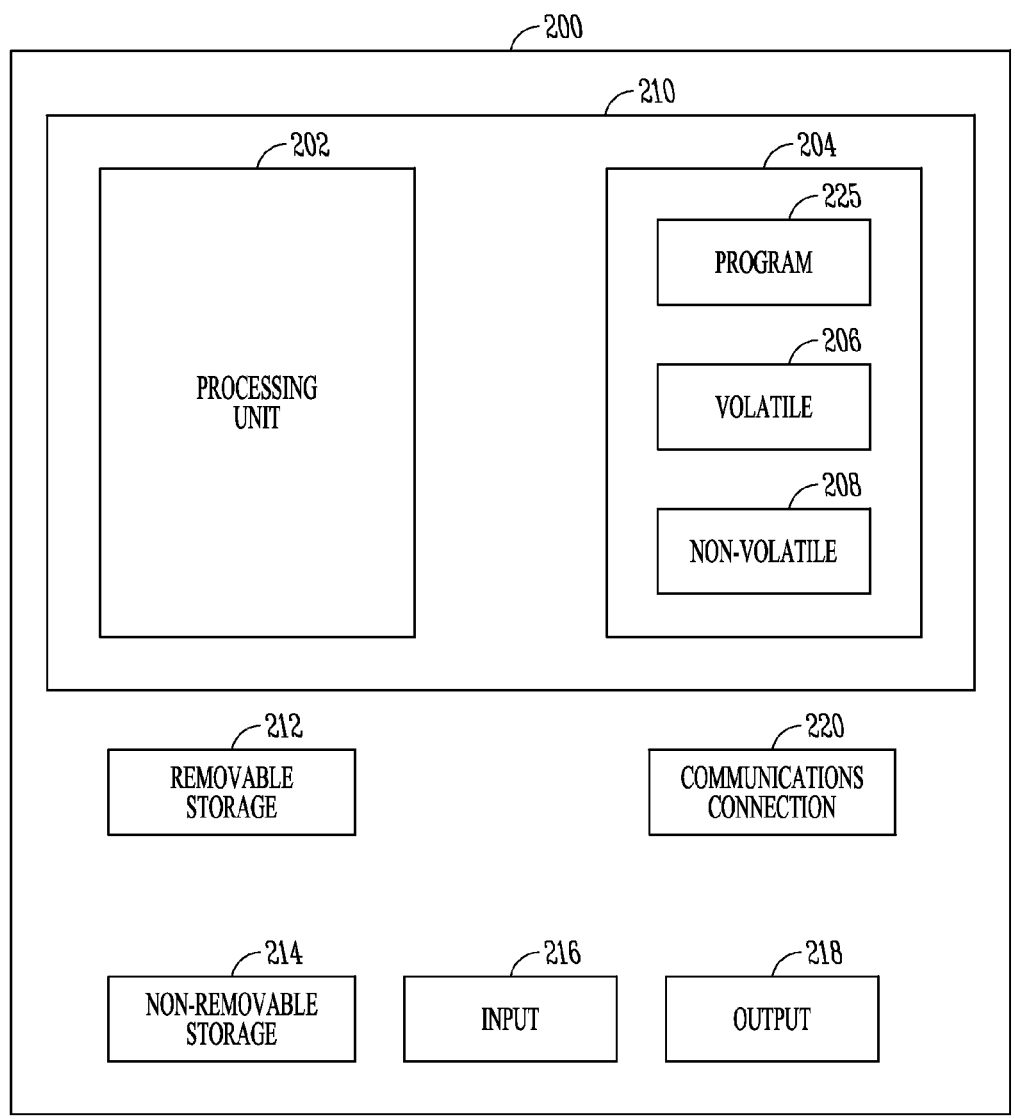
FIG. 3 illustrates an example computing system 200 for use in a controller according to the present technology.

Referring now to FIG. 3, there is illustrated a block diagram of a computer system 200 that executes programming for implementing the above-described algorithms as described in particular in FIGS. 1A and 1B. According to one embodiment, the MPC control algorithms are implemented as software modules in computer programs 225 on the system 200. A general computing device in the form of a computer 210 may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other tangible and physical medium capable of storing computer-readable instructions. Computer 210 may include or have access to a computing environment that includes input 216, output 218, and a communication connection 220. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. Computer-readable instructions stored on a tangible and physical computer-readable medium in a non-transitory form are executable by the processing unit 202 of the computer 210. A hard drive, CD-ROM, and RAM are some examples of articles including a computer-readable medium. According to one example embodiment, computer programs 225 are stored in memory 104, in storage devices 212 or 214, in other storage locations on the system or outside the system such as a network storage device, in any combination.

Figure 4:
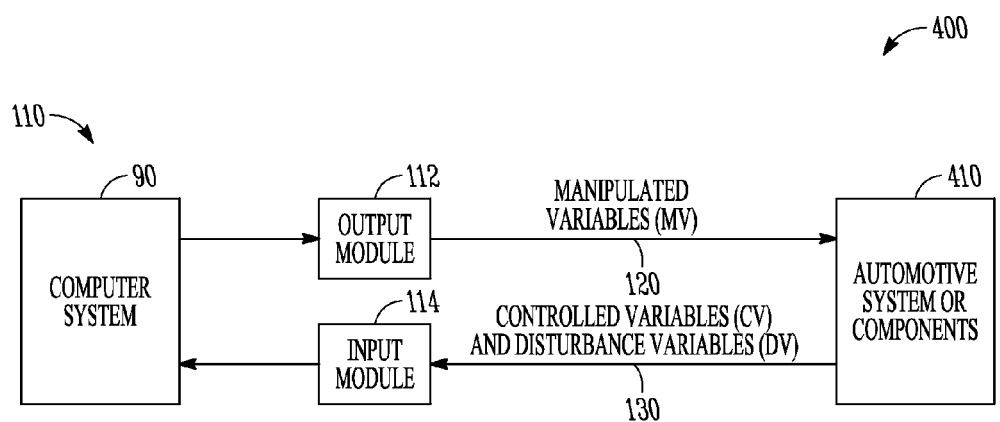
FIG. 4 illustrates an example application 400 of the MPC control technology described herein applied to control of automotive components.
Figure 5A:
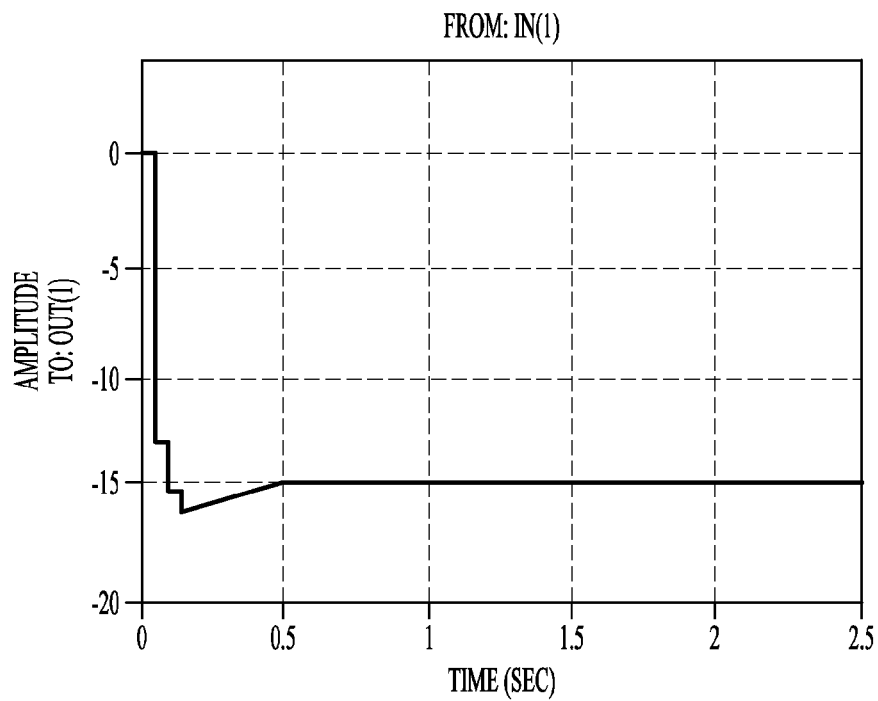
FIGS. 5A-5D and FIGS. 6A-6F illustrate an example application of the present technology to control of a diesel engine.
Figure 5B:
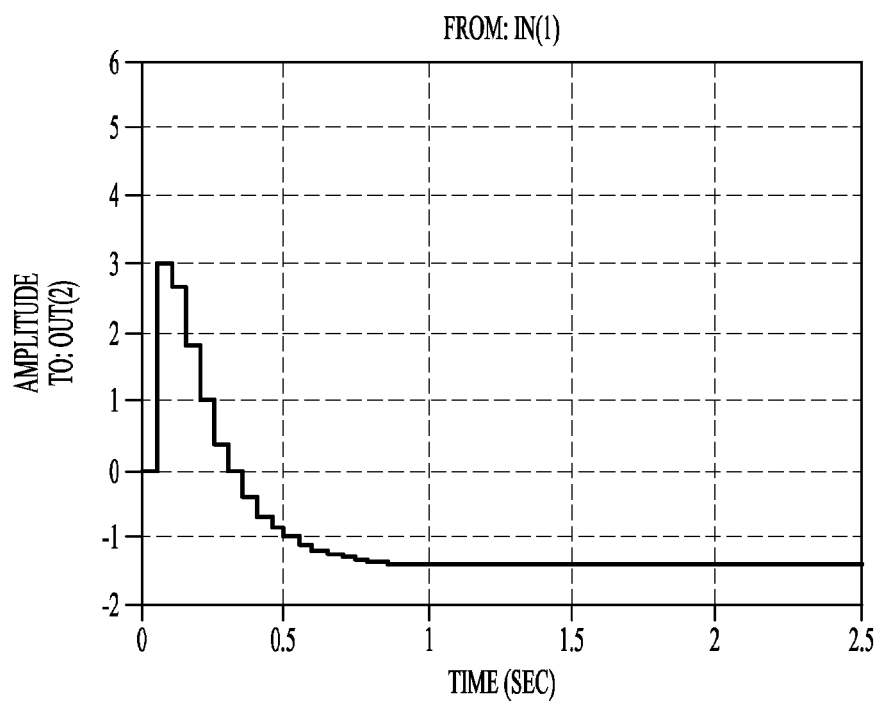
Figure 5C:
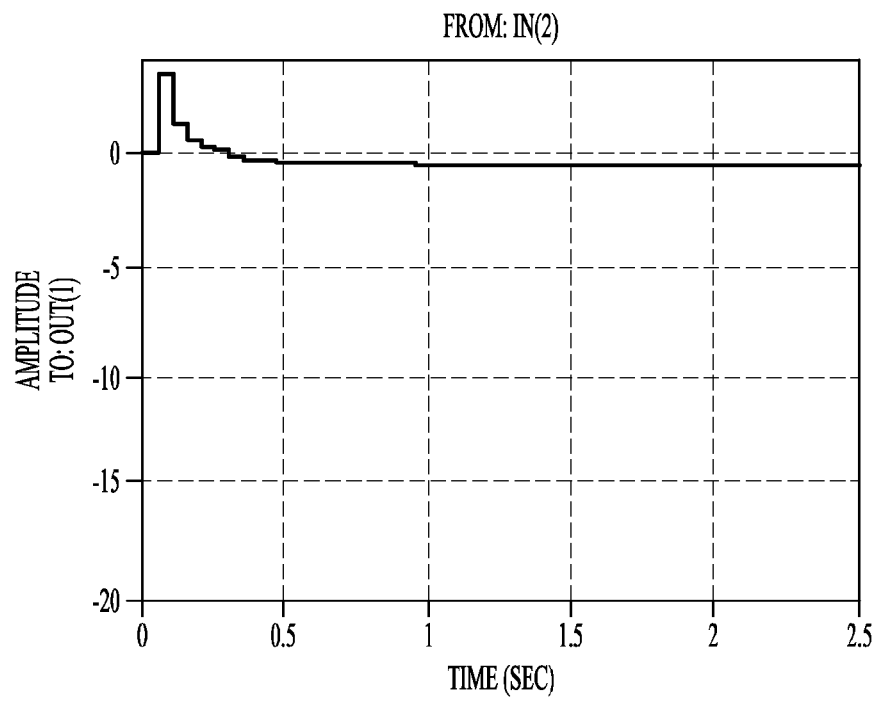
Figure 5D:
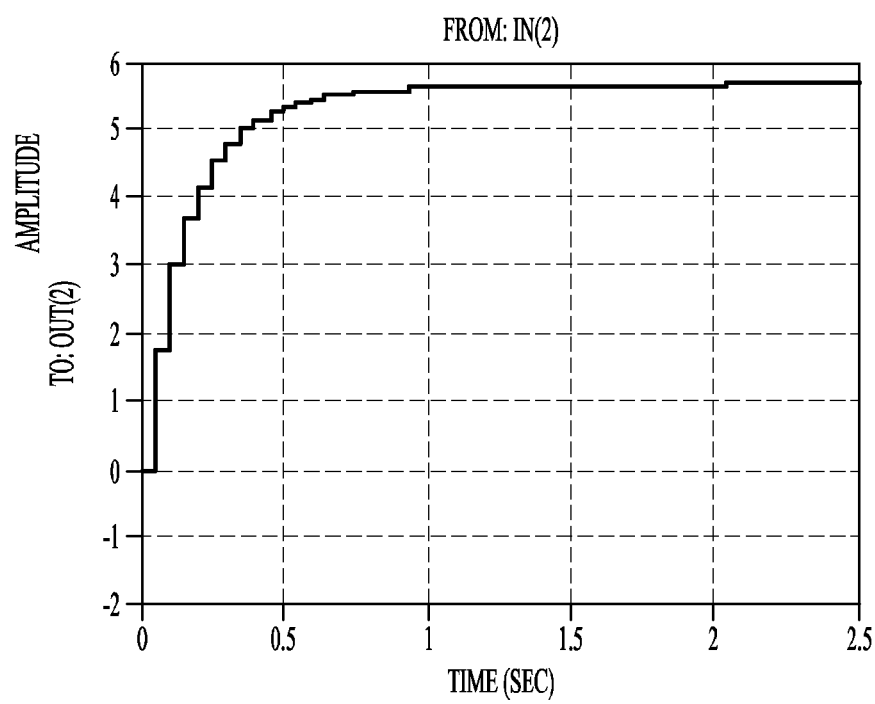
Figure 6A:
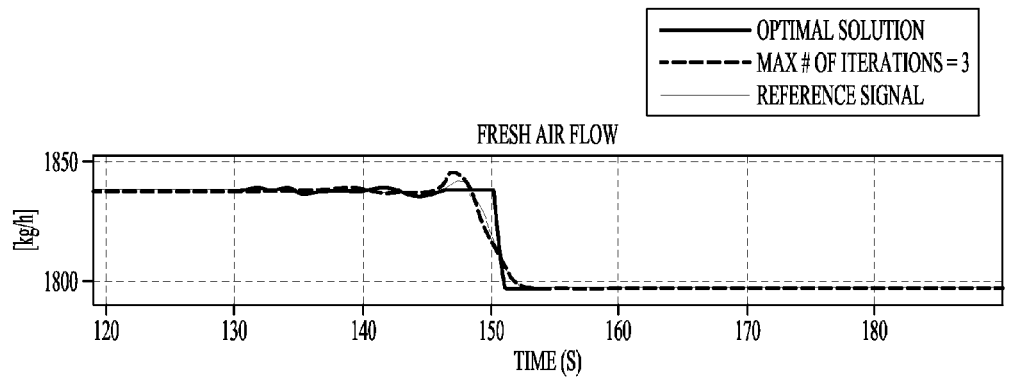
Figure 6B:
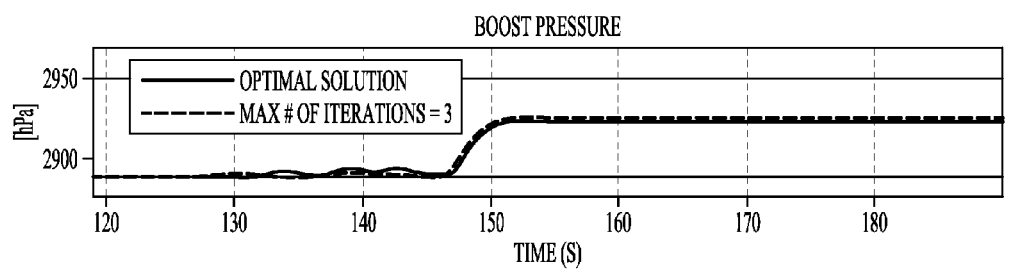
Figure 6C:
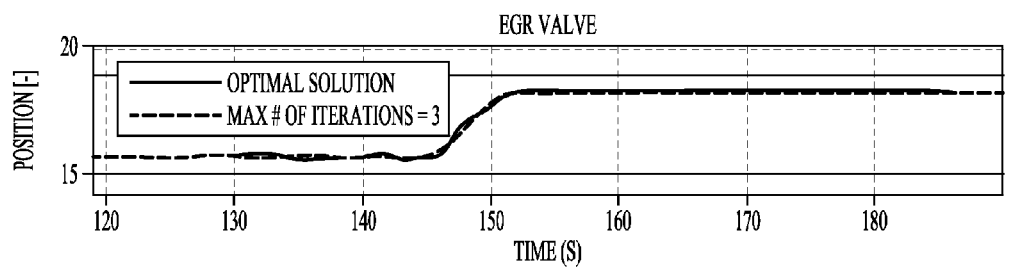
Figure 6D:
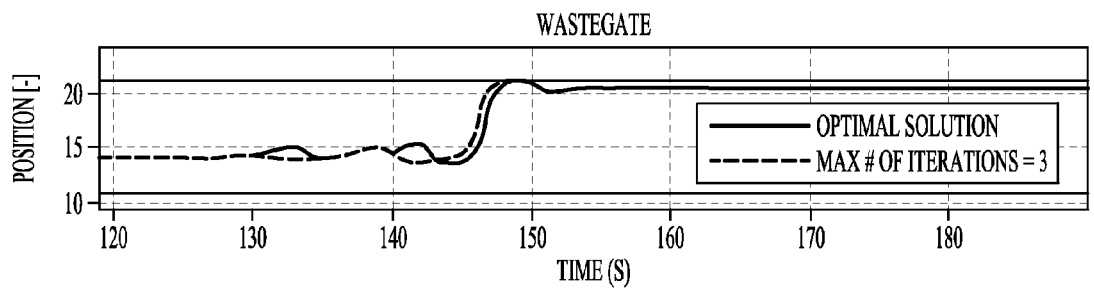
Figure 6E:
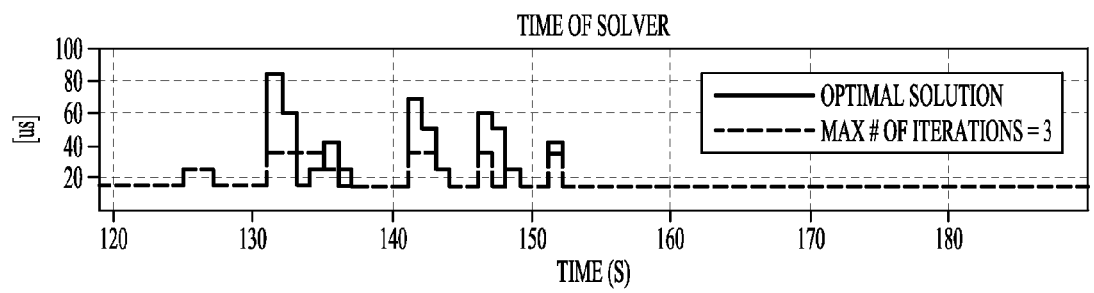
Figure 6F:
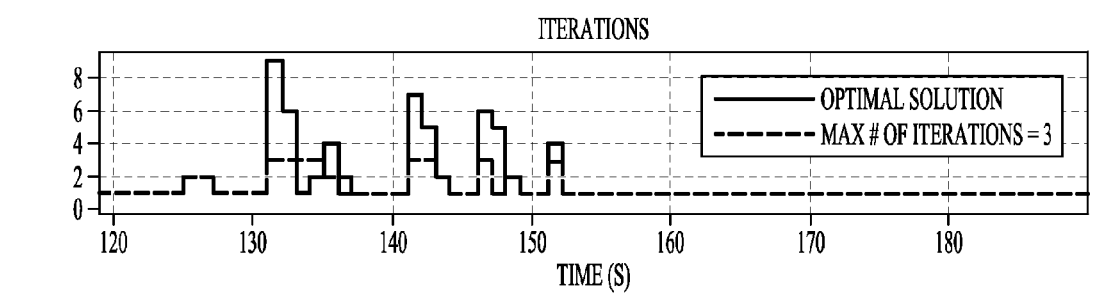

Referring now to FIG. 4, there is illustrated an application 400 of the MPC system of FIG. 3 to an internal combustion engine, and in particular to an engine that is designed to operate so as to reduce unwanted emissions. In this application, controller 110 is interfaced with one or more automotive systems or components 410. Systems or components 410 can include, for example but not by way of limitation, turbochargers, exhaust gas recirculation, valves, throttles, carburetors or fuel injectors, ignition systems, catalytic converters, braking controls or transmissions. According to other example embodiments, the MPC system of FIG. 3 may be applied to aerospace systems, such that systems or components 410 can be aerospace systems or components, as opposed to automotive components. In addition, the MPC system of FIG. 4 is suitable for any other embedded applications, for example to replace existing standard control methods such as networks of PID (proportional-integral-derivative) controllers, or for any other applications.

According to one example implementation of the present technology, it is applied to a simple typical diesel engine control problem, wherein the objective is to follow a prescribed set-point for fresh air flow (system output 1) while keeping the boost pressure (system output 2) within specified limits. The actuators are EGR (Exhaust Gas Recirculation), (system input 1) and waste gate valve (system input 2). Positions of both valves are constrained. This MPC control problem can be transformed to a QP problem with simple box constraints. The engine is linearized for a selected operating point. The resulting linear model is shown in FIGS. 5A, 5B, 5C, and 5D. In this example the resulting QP optimization problem for the real-time has 18 optimization variables. Therefore, there are 18 box constraints (total number of constraints is 2*18=36). To solve this problem the above-described process was used. Note that this QP problem needs to be solved at each sampling period.

The results are shown in FIGS. 6A, 6B, 6C, 6D, 6E, and 6F. There are two cases. In the first case, the optimal solution to the optimization problem is illustrated in solid black line. In the second case, the maximum number of iterations of the solver was limited to three. In the example, the warm start technique (the solver is started from the previous solution) was used, which reduced the number of iterations to find the optimal solution. The maximum number of iterations to find the optimal solution is nine. The effect on control performances is negligible when compared with the optimal solution.

According to one example embodiment but without limitation, the base MPC model used herein is a multivariable control algorithm that uses an internal dynamic model of the process, a history of past control moves, and an optimization cost function J over the receding prediction horizon to calculate the optimum control moves. In one example implementation, the process to be controlled can be described by a time-invariant nth-order multiple-input multiple-output (MIMO) ARX (Autoregressive Model with External Input) model:

$$y(k) = -\sum_{i=1}^{n} A(i)y(k-i) + \sum_{i=0}^{n} B(i)u(k-i) + \sum_{i=1}^{n} C(i)v(k-i) + e(k)$$

where u(k) is a vector of $n_u$ inputs or manipulated variables (MVs), v(k) is a vector of $n_v$ disturbance variables (DVs), y(k) is a vector of $n_y$ outputs or controlled variables (CVs), e(k) is a white noise sequence of measurement noise (an $n_y$ vector) with $n_y \times n_y$ covariance matrix $\Sigma$, and A(i), B(i) and C(i) are coefficient matrices (of appropriate dimensions $n_y \times n_y$, $n_y \times n_u$ and $n_y \times n_u$). Note that the latest data that are available for the prediction of the output y(k) are the disturbance v(k−1) and the values of manipulated variable u(k). With Kalman filter enabled, also the state space model or OE (Output Error) model can be used as an alternative.

According to one example embodiment, example AS solver algorithms suitable for implementation of the inventive subject matter are described in more detail in J. Nocedal, S. J. Wright, Numerical Optimization, Springer, 2006 or R. Fletcher, Practical Methods of Optimization, Wiley, 2003.

As described above the MPC technology described herein is particularly but not exclusively suitable for QP problems arising from the MPC control of embedded applications. For example, one application of the proposed method and system is an MPC controller for solving the multivariable control problems for internal combustion engines. The method can be also used as a core QP solver in Sequential Quadratic Programming (SQP). The SQP is a practical method for solving nonlinear optimization problems, for example in a nonlinear MPC.

Thus, the methods and systems described above reduce the number of iterations of the QP algorithm required to calculate a useful and effective control path. Accordingly, the improved MPC control strategy can be deployed using less computational resources. The reduced computation time afforded by the improved approach is particularly useful for applications with limited resources and/or short sampling period.

The Abstract is provided to comply with 27 C.F.R. §1.72(b) is submitted with the understanding that it will not be used to interpret or limit the scope or meaning of the claims.

What is claimed is:

1. A method of model predictive control of a controlled system with one or more physical components, comprising:
    at time t, sampling a current state of the controlled system and computing a cost function minimizing manipulated variables trajectories with a model predictive control (MPC) for a time horizon in the future, wherein the MPC uses a quadratic programming (QP) algorithm to find an optimal solution, and wherein the QP algorithm is solved using an Active Sets solver (AS) class algorithm with constraints based on gradient projection and using Newton step projection, wherein the Newton step projection facilitates adding of multiple constraints to a working set in each iteration of the algorithm, to facilitate identification of a set of active constraints in the optimal solution;
    implementing a move of the manipulated variables trajectories including outputting a control signal for directly or indirectly controlling the controlled system; and
    shifting the prediction horizon forward in time and repeating the sampling, computing and implementing steps.

2. A method according to claim 1, wherein the active set class algorithm uses constraints for optimization variables, wherein the constraints are defined as the lower and upper bounds.

3. A method according to claim 1, further wherein the gradient projection facilitates adding or removing of multiple constraints from a working set in each iteration of the algorithm, to facilitate identification of a set of active constraints in the optimal solution.

4. A controller used to control a controlled system with one or more physical components, comprising:
    a computer system including one or more computer programs operative on the computer system to:
        at time t, sample a current state of the controlled system and compute a cost function minimizing manipulated variables trajectories with a model predictive control (MPC) model for a time horizon in the future, wherein the MPC uses a quadratic programming (QP) algorithm to find an improved solution, and wherein the QP algorithm is solved using an Active Sets solver (AS) class algorithm with constraints based on gradient projection and using Newton step projection, wherein the Newton step projection facilitates adding of multiple constraints to a working set in each iteration of the algorithm, to facilitate identification of a set of active constraints in the improved solution; and
        implement a move of the manipulated variables trajectories by outputting a control signal used directly or indirectly to control the controlled system.

5. A controller according to claim 4, wherein the active set class algorithm uses constraints for optimization variables wherein the constraints are defined as the lower and upper bounds.

6. A controller according to claim 4, further wherein the gradient projection facilitates adding or removing of multiple constraints from a working set in each iteration of the algorithm, to facilitate identification of a set of active constraints in the improved solution.

7. A controller used to control an automotive system with one or more physical components, wherein the automotive system comprises one or more automotive components requiring control, the controller comprising:
    a computer system including one or more computer programs operative on the computer system to:
        at time t, sampling a current state of the one or more automotive components and computing a cost function minimizing manipulated variables trajectories with a model predictive control (MPC) for a time horizon in the future, wherein the MPC uses a quadratic programming (QP) algorithm to find an improved solution, and wherein the QP algorithm is solved using an Active Sets solver (AS) class algorithm with constraints based on gradient projection and using Newton step projection, wherein the Newton step projection facilitates adding of multiple constraints to a working set in each iteration of the algorithm, to facilitate identification of a set of active constraints in the improved solution using a specified maximum number of iterations; and implementing a move of the manipulated variables trajectories to facilitate control the one or more automotive components.

8. A controller according to claim 7, wherein the AS class algorithm uses constraints for optimization variables wherein the constraints are defined as the lower and upper bounds.

9. A controller according to claim 7, further wherein the gradient projection facilitates adding or removing of multiple constraints from a working set in each iteration of the algorithm, to facilitate identification of a set of active constraints in the improved solution.

10. A controller according to claim 7, further including moving the control horizon forward and repeating the determination of manipulated variable trajectories.

11. A controller for an automotive system, comprising:
processing unit;
an input for providing one or more controlled variables (CV) and/or disturbance variables (DV) to the processing unit from the automotive system;
an output for providing one or more manipulated variables (MV) from the processing unit to the automotive system, wherein each of the one or more manipulated variables (MV) have a trajectory;
the processing unit configured to sample one or more of the one or more controlled variables (CV) and/or disturbance variables (DV) at a time "t", and to compute a cost function minimizing the trajectory of one or more of the manipulated variables (MV) using a model predictive control (MPC) over a time horizon, wherein the MPC uses a quadratic programming (QP) algorithm that has constraints and that uses Newton step projection, wherein the Newton step projection facilitates adding of multiple constraints to a working set in each iteration of the algorithm, to facilitate identification of a set of active constraints in an improved solution using a specified maximum number of iterations; and implementing a move of the trajectory of one or more of the manipulated variables (MV), and outputting one or more of the manipulated variables (MV) to the automotive system.

12. A controller according to claim 11, wherein the quadratic programming (QP) algorithm is solved using an Active Sets solver (AS) class algorithm with constraints based on gradient projection and using Newton step projection.

13. A controller according to claim 11, wherein the processing unit shifts the time horizon forward, and then samples one or more of the one or more controlled variables (CV) and/or disturbance variables (DV) a second time.

14. A controller according to claim 11, wherein after the processing unit samples one or more of the one or more controlled variables (CV) and/or disturbance variables (DV) for the second time, the processing unit again compute a cost function minimizing the trajectory of one or more of the manipulated variables (MV) using a model predictive control (MPC) over a time horizon, and implements a move of the trajectory of one or more of the manipulated variables (MV), and further outputs one or more of the manipulated variables (MV) to the automotive system.

15. A controller according to claim 11, wherein the automotive system includes one or more actuators, and wherein the one or more manipulated variables (MV) are used to control one or more of the actuators.

16. A controller according to claim 15, wherein one or more of the actuators include an EGR valve.

17. A controller according to claim 15, wherein one or more of the actuators include an Waste Gate Valve.

* * * * *